United States Patent [19]
Fromknecht et al.

[11] 3,820,310
[45] June 28, 1974

[54] VACUUM CLEANER INLET BAFFLE

[75] Inventors: Charles T. Fromknecht, Anderson; John C. Davis, Greenwood, both of S.C.

[73] Assignee: The Singer Company, New York, N.Y.

[22] Filed: Jan. 29, 1973

[21] Appl. No.: 327,385

[52] U.S. Cl............... 55/447, 55/337, 55/459, 55/462, 55/467, 55/DIG. 3
[51] Int. Cl............................................ B01d 45/12
[58] Field of Search............... 55/337, 467–472, 55/459, 462, 436, DIG. 3, 418, 320, 438, DIG. 8, DIG. 40, 464; 15/327 DR, 327 E

[56] References Cited
UNITED STATES PATENTS

| | | | |
|---|---|---|---|
| 2,057,257 | 10/1936 | Walker | 55/187 |
| 3,113,874 | 12/1963 | Bausch et al. | 99/174 |
| 3,508,291 | 4/1970 | Klebe, Jr. | 174/135 |
| 3,599,273 | 8/1971 | Shirayanagi et al. | 55/467 |
| 3,605,786 | 9/1971 | Machin, Jr. | 55/420 |
| 3,621,641 | 11/1973 | Hisaotakei et al. | 55/472 |
| 3,676,986 | 7/1972 | Reiling | 15/327 E |
| 3,732,667 | 5/1973 | Fromknecht et al. | 55/337 |

*Primary Examiner*—Frank W. Lutter
*Assistant Examiner*—David L. Lacey
*Attorney, Agent, or Firm*—Marshall J. Breen; Chester A. Williams, Jr.; Alan Ruderman

[57] ABSTRACT

A wet/dry utility vacuum cleaner including a dirt receptacle having an inlet aperture. A baffle is mounted behind the inlet within the receptacle to divert the incoming dirt and/or liquid ladden air tangentially downwardly. The construction of the baffle is such that it may flex or yield to allow trapped dirt to dislodge upon emptying the receptacle. One embodiment of the baffle is a thin sheet of polethylene film. A second embodiment is a rigid member having a hinged flap.

8 Claims, 5 Drawing Figures

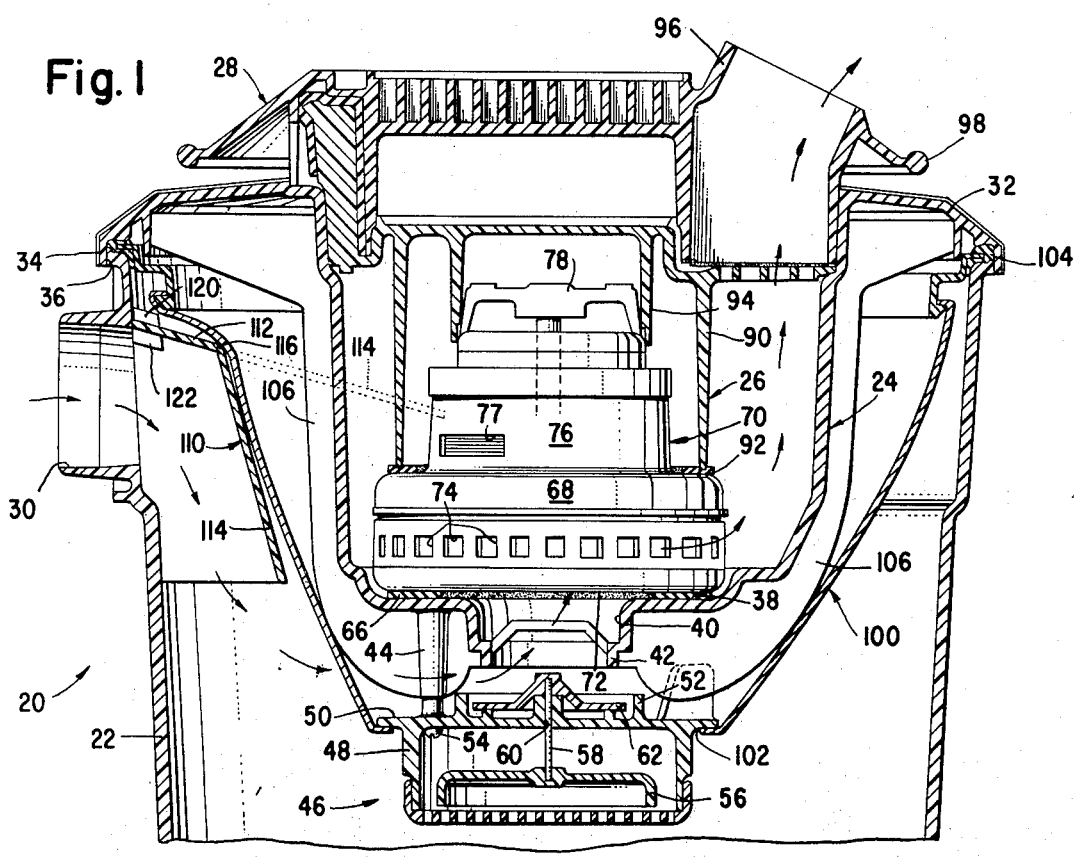

3,820,310

VACUUM CLEANER INLET BAFFLE

BACKGROUND OF THE INVENTION

This invention relates generally to suction cleaners and more particularly to inlet baffles for suction cleaner dirt collecting receptacles.

Vacuum cleaners of the type including a dirt receptacle have long been constructed with inlet baffles to prevent the dirty inlet airstream from impinging directly on the filter and to obtain the separating benefits of cyclonic airflow action. For cleaners of the wet/dry type, such as that described in co-pending U.S. Pat. application Ser. No. 320,802 filed Jan. 3, 1973, the baffle preferably should be larger to prevent liquid from spraying onto the filter. It has been found, however, that due to the retaining forces of friction and the increased surface areas of these larger baffles dry dirt and debris tends to remain in the baffle upon emptying a filled receptacle.

SUMMARY OF THE INVENTION

It is therefore the primary object of this invention to provide an inlet baffle for a vacuum cleaner of this type which will allow the dirt to dislodge upon emptying.

Another object of this invention is to provide an inlet baffle for a dirt receptacle of a vacuum cleaner which is pliant so that when the receptacle is inverted for emptying a portion of the baffle folds away from the inlet.

A further object of this invention is to provide an inlet baffle for a vacuum cleaner dirt receptacle which prevents the accumulation of large particles of debris from clogging up behind the inlet.

These and other objects are achieved by providing a vacuum cleaner and dirt receptacle having an inlet baffle mounted behind the inlet which is readily yieldable so as to move away from the inlet aperture when the receptacle is inverted. One embodiment of the present invention provides a baffle which comprises a sheet of thin flexible film material while a second embodiment includes a hinged flap.

BRIEF DESCRIPTION OF THE DRAWINGS

The particular features and advantages of the invention as well as other objects will become apparent from the following description taken in connection with the accompanying drawings, in which:

FIG. 1 is a vertical cross-sectional view of a portion of a vacuum cleaner incorporating an inlet baffle constructed in accordance with a first embodiment of the present invention;

FIG. 2 is a prospective view of the inlet baffle illustrated in FIG. 1 with the flap shown by solid lines in its operating position, while the dotted lines are an inversion of the position which the flap assumes when the receptacle is inverted for emptying;

FIG. 3 is an enlarged view of the hinge portion of the baffle shown in FIG. 2;

DESCRIPTION OF THE PREFERRED EMBODIMENTS

Figure 4:
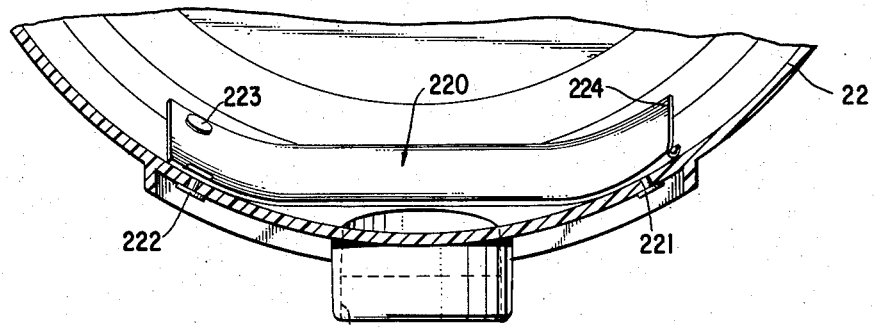
FIG. 4 is a cross-sectional view through a portion of a dirt receptacle of a vacuum cleaner similar to that shown in FIG. 1, but incorporating a baffle constructed in accordance with a second embodiment of the present invention.

Referring now to the accompanying drawings wherein like reference numerals denote similar parts throughout the various views there is illustrated a vacuum cleaner capable of both wet and dry cleaning and generally designated 20. The cleaner comprises an open top substantially cylindrical dirt receptacle 22 and a power suction module comprising a lower housing 24, a separator housing 26 and a top housing 28. Formed adjacent to the open end of the dirt receptacle 22 is an air suction inlet conduit 30 opening into the receptacle to form an aperture and adapted to couple a conventional vacuum cleaner flexible hose (not shown) in the usual manner.

The lower housing 24 is substantially cup shaped having a peripheral flange 32 including a peripheral rim 34 substantially corresponding in shape to the periphery of the top of the dirt receptacle, and includes at its underside an annular groove 36 for receiving a top peripheral portion of the dirt receptacle. In this manner the lower housing is supported on the dirt receptacle with the cup shaped portion of the housing nested therein. At the bottom of the housing 24 there is formed a substantially flat circular seating portion 38 having an aperture 40 formed centrally therein with a downwardly extending neck 42 communicating with the interior of the dirt receptacle. A number of threaded bosses 44 (only one of which is shown) are molded on the bottom of the housing 24 radially outwardly from the aperture 40 for supporting a valve housing assembly generally designated as 46.

The valve housing assembly 46 comprises a substantially cylindrical valve housing 48 extending downwardly from a flanged disc portion 50. Mounting screws 54 pass into the bottom of the disc 50 and are threadedly received into the bosses 44 to secure the assembly 46 to the housing 24. An inverted cup shaped plastic float valve 56 having a short metal rod 58 centrally secured to the upper surface thereof is positioned within the housing 48. The rod 58 extends through a substantially central opening 60 in the surface of the disc 50 and is secured at its upper end to a valve member 62 adapted to close off the airflow to the aperture 40. Further details of the valve assembly may be had by reference to co-pending U.S. Pat. application Ser. No. 320,801 filed Jan. 3, 1973.

Mounted on an annular seal 66 positioned in the seat 38 is the blower 68 of a motor-blower unit generally designated as 70. The blower has a centrally disposed inlet 72 positioned in communication with the aperture 40 and includes a plurality of exhaust openings 74 tangentially disposed about the cylindrical housing thereof. Mounted vertically above the blower is the motor portion 76 of the motor-blower unit and includes a cooling air exhaust opening 77. The separator housing 26 is secured by means not shown to a motor yoke 78 at the top of the motor-blower unit. An outer cylindrical wall 90 of the separator 26 engages a seal 92 on the upper surface of the blower housing to define an exhaust air chamber between the separator housing and the lower housing 24. An inner cylindrical wall 94 engages the upper portion of the motor housing just below the yoke and defines with the outer wall 90 a cooling air exhaust chamber communicating with the opening 77 of the motor. The upper housing 28 is formed with an upwardly extending wall 96 which defines the working air exhaust port for the cleaner. The outer peripheral edge 98 on the top housing 28 is spaced above the peripheral portion of the lower housing 24 to define therebetween a cooling air inlet space, which is more completely described in co-pending U.S. Pat. application Ser. No. 320,802. The cooling air which enters this space on one side of the cleaner passes through the motor and exhausts through the space at the other side of the cleaner. A filter 100, described in detail in co-pending U.S. Pat. application Ser. No. 320,801, is positioned about the top periphery of the receptacle 22. The filter is of a substantially cup shape comprising a fabric material and having an opening 102 in the bottom peripheral portion through which the valve housing 48 protrudes. The upper peripheral portion of the filter 100 includes a resilient gasket 104 which provides a seal between the dirt receptacle and the housing 24. A plurality of ribs 106 formed on the housing 24 aid in maintaining the cup shape of the filter despite the pressure differential thereacross.

Disposed behind the inlet 30 is a first embodiment of an inlet baffle 110 constructed in accordance with the principles of this invention. This baffle comprises a polypropylene plastic unitary member having a mounting portion 112 joined to a flap portion 114 by a living hinge 116. The mounting portion has a mounting edge 118 corresponding in shape to that of the receptacle above the inlet 30. Preferably, a pair of mounting brackets 120 and 122 are formed on the edge 118 for receiving rivets or the like to secure the baffle to the receptacle. The flap 114 is shaped so that it engages the receptacle on one edge 124 when it is in the downward or operative position as illustrated in FIG. 1. Since the edges 118 and 124 engage the receptacle, the air leaving the inlet is diverted tangentially downwardly so as to cause the incoming airstream to effect a cyclonic airflow action. FIG. 3 illustrates an enlarged view of the hinge portion 116 which is molded integral with and thinner than the remainder of the baffle so that it may bend or fold, and is known in the art as a "living hinge." It has been found that when a hinge thickness of between 0.012 to 0.015 inch was used with a flap and mounting portion thickness of approximately 0.080 inch the proper flexibility and durability of the baffle was attained.

In operation the flap is maintained in its downward disposition by the filter 100 and the ribs 106. When the receptacle 22 is full, the housing 24 together with the motor-blower and the valve mechanism is removed from the receptacle. When the filter is next lifted out off the receptacle, the flap 114, by the action of the hinge 116, turns upwardly slightly. As the receptacle is inverted for emptying, the weight of the flap causes it to turn further away from the inlet, the dotted lines in FIGS. 1 and 2 substantially illustrate an inverted view of this disposition. Thus, any dirt lodged behind the inlet between the receptacle wall and the baffle is released.

Figure 5:
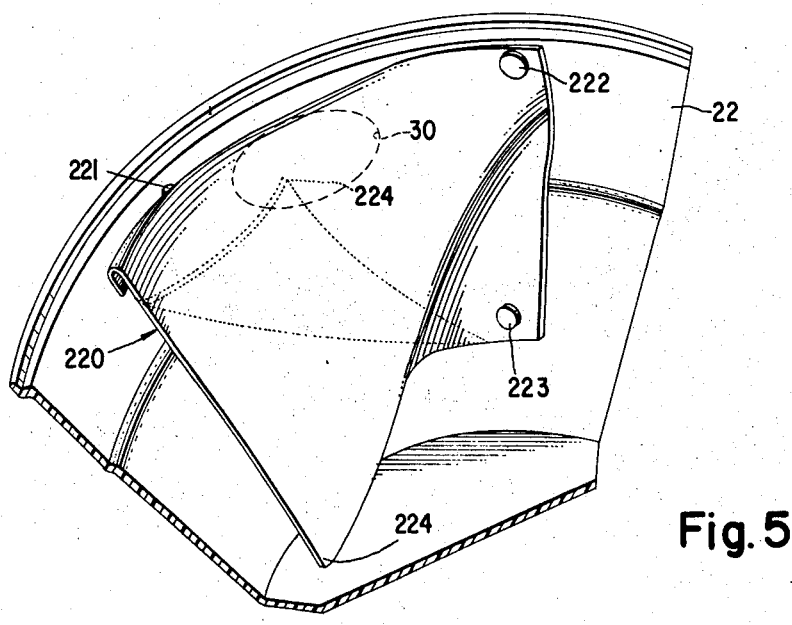
FIG. 5 is a perspective view through the vacuum cleaner dirt receptacle of FIG. 4 illustrating the second inlet baffle embodiment and showing an inversion of the baffle in dotted lines during the emptying condition of the receptacle.

FIGS. 4 and 5 illustrate a second embodiment of a baffle constructed in accordance with the present invention. This baffle, designated as 220, is a thin sheet of polyethylene film material which is secured to the receptacle about the inlet 30. A film of approximately 0.010 inch thick has been found to provide the proper flexibility and durability. In the embodiment illustrated, the baffle is shown as rectangular in elevation, but this specific shape is not considered critical. It does, however, allow for a simple mounting arrangement. Three fastening means 221, 222, and 223 such as rivets or the like may be used to secure the upper two corners and one bottom corner of the sheet to the receptacle. The fourth corner is left free so that the incoming air-stream is directed by the baffle tangentially downwardly. The resiliency of the construction is such that when the receptacle is inverted for emptying the free corner 224 folds over and away from the inlet and any dirt lodged therebehind is released. To provide for a smooth folding away of the corner 224 the corner adjacent the rivet 221 is folded over as illustrated in FIG. 5 and the rivet is applied to the backside. The construction of this embodiment of the invention is also such, since the material is flexible, that leaves and other large debris under the influence of the airstream force the baffle away from the inlet during operation and thus clogging of the inlet is prevented.

Two embodiments of an inlet baffle are therefore provided which aid in dislodging the debris from between the inlet and the baffle. Numerous alterations of the structure disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. In a vacuum cleaner having an open top dirt receptacle including a suction inlet aperture formed in the receptacle, a baffle mounted behind the inlet within the receptacle, said baffle being substantially larger than said inlet aperture and normally abutting said receptacle above said inlet and at one side thereof and spaced from said receptacle below and at the other side of said inlet for diverting air entering the inlet tangentially downwardly, said baffle having at least a pliant foldable portion, said portion folding solely by the force of gravity toward said inlet aperture when the receptacle is upright and away from said inlet aperture when said receptacle is inverted.

2. In a vacuum cleaner as recited in claim 1 wherein said baffle comprises a sheet of plastic film material.

3. In a vacuum cleaner as recited in claim 2 wherein said sheet is fastened to the receptacle about said inlet at three locations, two of said locations being laterally spaced above said inlet, and the other of said locations being below said inlet on said abutting one side of said inlet.

4. In a vacuum cleaner as recited in claim 1 wherein said baffle comprises a sheet of polyethylene film.

5. In a vacuum cleaner as recited in claim 4 wherein the thickness of the film is approximately 0.10 inch.

6. In a vacuum cleaner as recited in claim 1 wherein said baffle comprises a unitary plastic member having a first portion thereof secured to said receptacle above said inlet, said pliant portion including a flap formed to said first portion by a living hinge.

7. In a vacuum cleaner as recited in claim 6 wherein said baffle comprises polypropylene.

8. In a vacuum cleaner as recited in claim 7 wherein the thickness of said living hinge is within a range of 0.012 to 0.015 inches and the thickness of said first portion and said flap is approximately 0.080 inches.

* * * * *

UNITED STATES PATENT OFFICE
CERTIFICATE OF CORRECTION

PATENT NO. : 3,820,310
DATED : June 28, 1974
INVENTOR(S) : Charles T. Fromknecht, and John C. Davis It is certified that error appears in the above-identified patent and that said Letters Patent are hereby corrected as shown below:

Column 4, line 56 (claim 5, line 2), change "0.10" to --0.010--.

Signed and Sealed this twenty-sixth Day of August 1975

[SEAL]

Attest:

RUTH C. MASON
Attesting Officer

C. MARSHALL DANN
Commissioner of Patents and Trademarks